(12) United States Patent
Crotty et al.

(10) Patent No.: US 8,401,083 B2
(45) Date of Patent: Mar. 19, 2013

(54) EXTREME VIDEO COMPRESSION OVER A FIXED BANDWIDTH CHANNEL

(75) Inventors: Gregory T. Crotty, Morris Plains, NJ (US); Christopher Carmichael, Laguna Niguel, CA (US)

(73) Assignee: Ubiquity Holdings, Inc, San Juan Capistrano, CA (US)

( * ) Notice: Subject to any disclaimer, the term of this patent is extended or adjusted under 35 U.S.C. 154(b) by 1188 days.

(21) Appl. No.: 12/212,601

(22) Filed: Sep. 17, 2008

(65) Prior Publication Data
US 2009/0074055 A1   Mar. 19, 2009

Related U.S. Application Data

(60) Provisional application No. 60/973,422, filed on Sep. 18, 2007.

(51) Int. Cl.
   *H04B 1/66* (2006.01)
(52) U.S. Cl. ......... 375/240.24; 375/240.01; 375/240.12; 375/240.16; 382/173; 382/199

(58) Field of Classification Search ............ 375/240.01, 375/240.16, 240.12, 240.24; 382/173, 199
See application file for complete search history.

(56) References Cited

U.S. PATENT DOCUMENTS

| | | | |
|---|---|---|---|
| 2002/0034249 A1* | 3/2002 | Kadono et al. | 375/240.12 |
| 2002/0191846 A1* | 12/2002 | Crinon et al. | 382/173 |
| 2003/0081836 A1* | 5/2003 | Averbuch et al. | 382/199 |
| 2006/0039690 A1* | 2/2006 | Steinberg et al. | 396/155 |
| 2006/0088191 A1* | 4/2006 | Zhang et al. | 382/107 |
| 2006/0098738 A1* | 5/2006 | Cosman et al. | 375/240.16 |

OTHER PUBLICATIONS

Zhihai He, Jianfei Cai, and Chang Wen Chen,"Joint Source Channel Rate—Distortion Analysis for Adaptive Mode Selection and Rate Control in Wireless Video Coding", vol. 12, No. 6, Jun. 2002, pp. 511-523.*

* cited by examiner

*Primary Examiner* — Andrew Nalven
*Assistant Examiner* — Amir Mehrmanesh
(74) *Attorney, Agent, or Firm* — Law Office of Scott C. Harris, Inc.

(57) ABSTRACT

Compression using a graded wavelet, general and camera motion compensation, and spatial and entropy coding to create a compressed video.

23 Claims, 8 Drawing Sheets

Frame 17

The Darkened Area of the Subject is
Removed and Becomes the Border Frame.

Frame 17

The Subject of the Shifted Frame is Shifted Back
to the Position of the Reference Frame.

EXTREME VIDEO COMPRESSION OVER A FIXED BANDWIDTH CHANNEL

This application claims priority from Provisional application Ser. No. 60/973,422, filed Sep. 18, 2007, the entire contents of which are herewith incorporated by reference.

BACKGROUND

Video compression can be used for various features including allowing more data to be sent over a fixed bandwidth channel. It is also desirable to use fixed bandwidth channels such as the cellular network to send and receive videos.

SUMMARY

The present system describes compressing video in a special way to obtain good quality streams at a higher rate than possible over existing techniques. One aspect describes encoding streams and broadcasting the encoded streams over IP-based networks including cellular networks.

BRIEF DESCRIPTION OF THE DRAWINGS

These and other aspects will now be described in detail with reference to the accompanying drawings, wherein.

DETAILED DESCRIPTION

An embodiment used herein describes compressing data for the purpose of storing it or sending it over a network with limited memory buffer and limited network power. Embodiments also describe decompressing the data that has been so compressed. The basic flowchart of compression of videos and images follows the flowchart of FIG. 1A as described in detail herein. The basic decompression follows the flowchart of FIG. 1B.

The techniques described herein can provide good quality at 24 frames per second and 16 bit color. Exemplary results from such a system have provided compression ratios of 500 to 1. An individual frame can be compressed with a compression ratio of 100 to 1.

An embodiment is described herein that uses all of spatial, temporal and entropy encoding in order to deliver a compressed video stream in one embodiment, or to deliver a compressed single image according to another embodiment. As explained below, a special form of interframe compression is carried out for spatial compression. An intra frame compression is used as part of the temporal compression. Both the spatial and temporal compression can use a wavelet transform.

According to embodiments, the wavelet transform decomposes the image into different resolutions or scales, referred to herein as "graded wavelets". These scales can be referred to as averages and details. According to this system, the different details of resolution can be selected. This can be selected from the finest scale hierarchically down to the coarsest detail of resolution. Receiving the different levels allows reconstructing parts of the image/video.

Figure 4:
FIG. 4 shows a wavelet transform that compresses the channel using details with coarsest to finest scaling.
Figure 4:
Figure 5:
FIGS. 5 and 6 illustrates the difference scaling.
Figure 6:
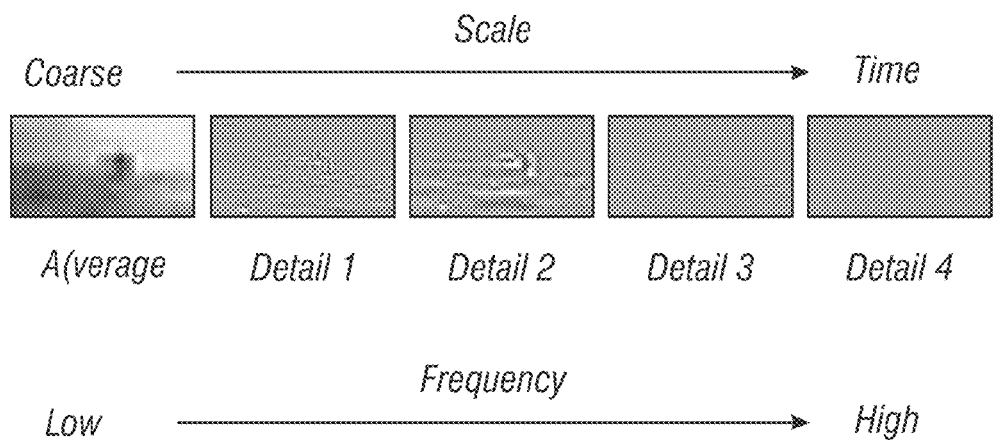
Figure 7:
FIG. 7 illustrates a coding comparison.

For example, FIG. 4 shows an original color image on the top, and on the bottom shows the scaled wavelet transform that can be used according to the present system, each having a different resolution. The average component coefficients are located in the top left corner of the wavelet transform. The rest of the wavelet transform has details that extend from the coarsest scale which is adjacent to the average, to the finest scale which is furthest away from the average.

Another technique carries out compensation for temporal compression of the wavelet images including camera motion compensation as part of that compression. The inventors found that camera motion compensation applied to a group of frames can improve the compression of the wavelet streaming images by a factor of between 2 and 10 times. Camera motion redundancy correction can further reduce the redundancy of data in compressed video streams.

According to embodiments, both general motion compensation in addition to camera motion compensation can each be carried out. The general motion compensation splits the video into two parts at 135. First, the video is compressed using the basic compression system as described herein (compression 1 in FIG. 1), for example. This is used to produce about 75% of the total desired bit budget. The resulting compressed movie is called a background field, and provides the basic part of the movie that is obtained.

At a subsequent time, after this initial part, differences between the original movie and the background field are compressed separately, using the remainder of the available bit budget at 141. These differences are referred to as the correction field. The background field and correction field are produced separately.

On the decoder end, the background field is decoded at 150, and the correction field is decoded at 155. The fields are added together to produce the final viewed video.

The correction field is compressed with the observation that this field is concentrated near images and in areas with motion. However, large areas of the correction field often contain almost no information. The correction field is therefore compressed highly locally. Certain parts of the correction field are tracked across frames to create a motion compensated stack. Each of the motion compensated stack parts may then be compressed preferably using the wavelet transform.

Image reconstruction in the decoder may use techniques that are in essence the opposite of the above.

Information about the magnitude of the wavelet transform coefficients are transmitted along with the position of the significant transform coefficients. Each wavelet coefficient includes three designations: magnitude and location x and y positions.

Wavelets may not operate as efficiently when transmitting wavelet transform data. One object of the present compression scheme is to transmit the more significant pieces of information first. If the bitstream is interrupted, or if the channel does not have enough bandwidth to handle the entire bitstream, at least part of the information is obtained and can be viewed. Moreover, this provides an easy way to adjust the protocol for different bit budgets. This system can be used to provide priority to important information such as keyframes.

Figure 1A:
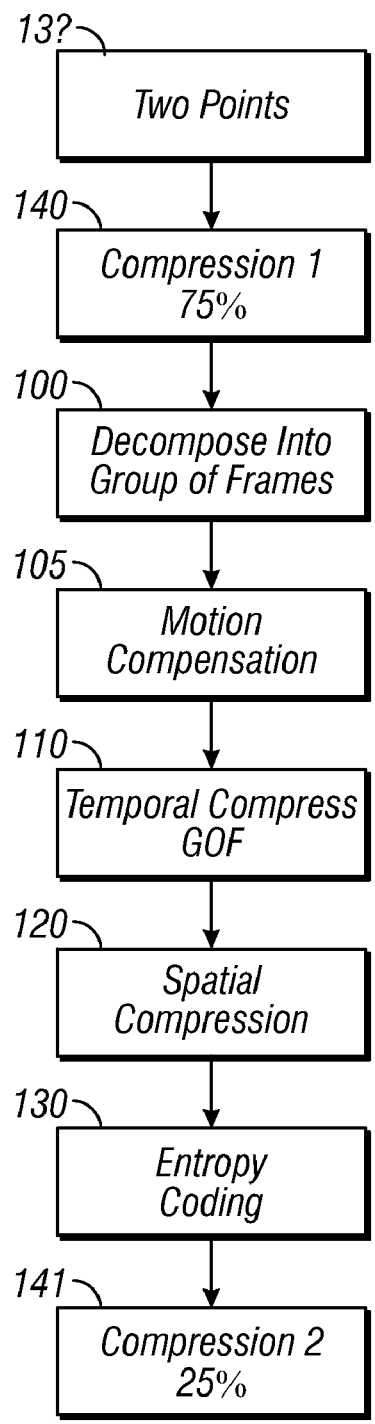
FIG. 1A shows an overall flowchart of compression.
Figure 1B:
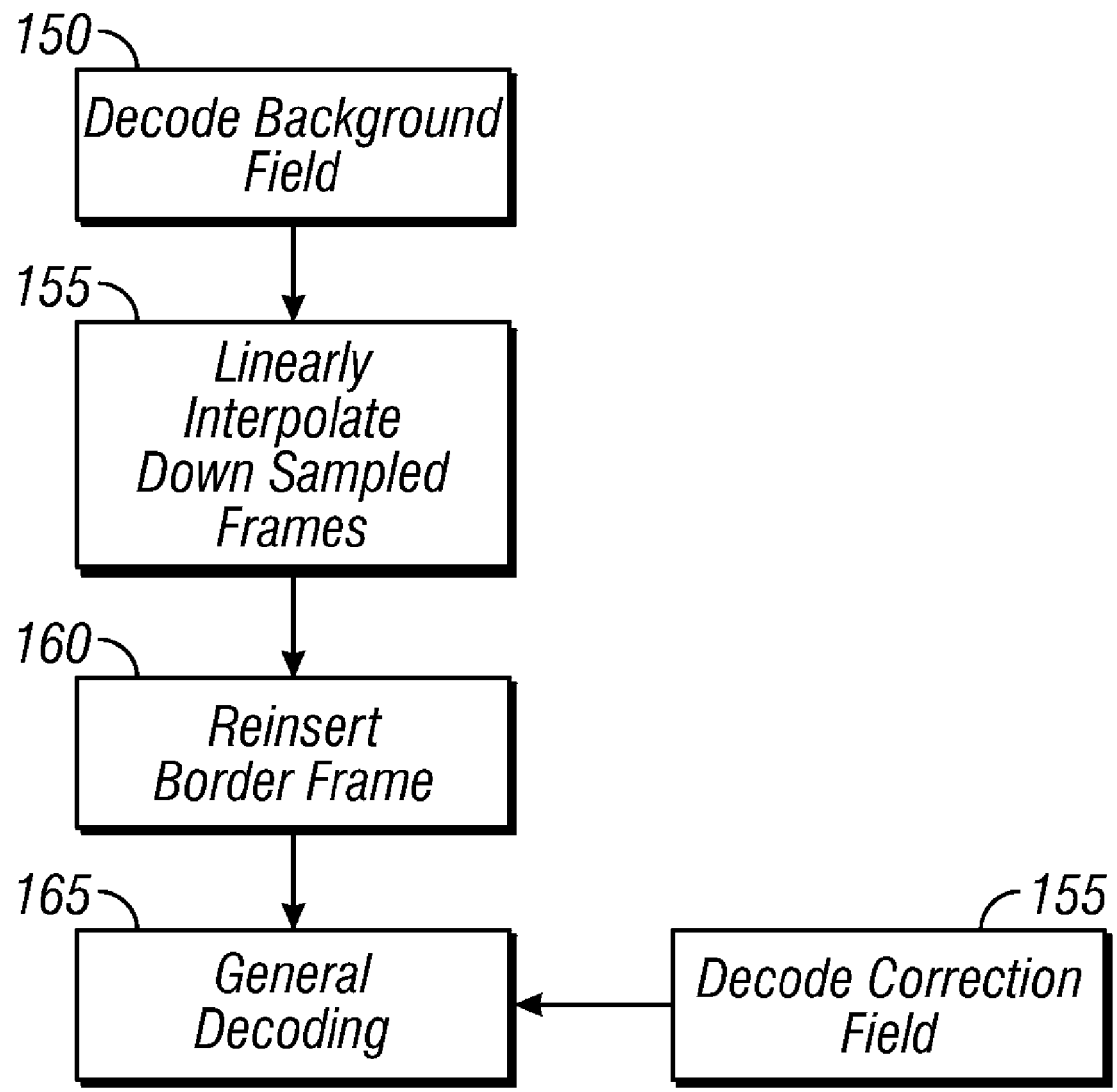
FIG. 1B shows an overall flowchart of decompression/decoding.

The basic compression embodiment follows the flowchart of FIG. 1A.

At 100, a video is decomposed into groups of frames. The number of frames per group can be determined by available memory, or compression efficiency, or by some other characteristic.

Camera motion compensation is carried out at 105. This may be carried out prior to any other kind of compression as shown, or alternatively can be carried out any other time within the compression sequence.

Both camera motion compensation and also general motion compensation can be carried out as part of this compression.

Each group of frames is temporally compressed at 110. Wavelet images have historically been more difficult to compress temporally, because they lack the ability to carry out block construction of JPEG images. The camera motion compensation adds consistency to the images.

After the temporal compensation is carried out at 110, spatial compression is carried out at 120 using the wavelet transformation as described herein.

Following this, entropy coding is carried out at 130.

Figure 2:
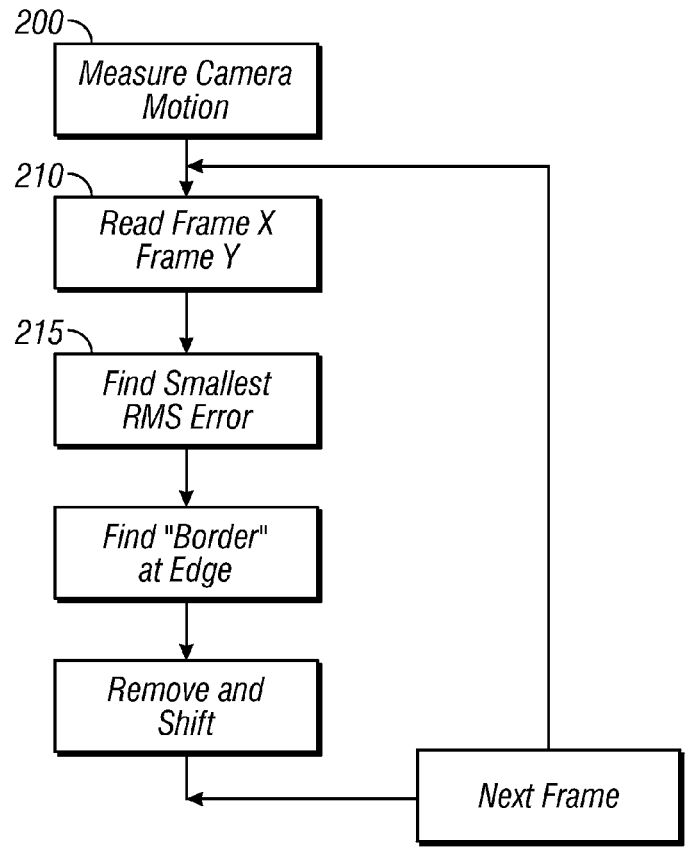
FIG. 2 shows a flowchart of temporal compression.
Figure 8:
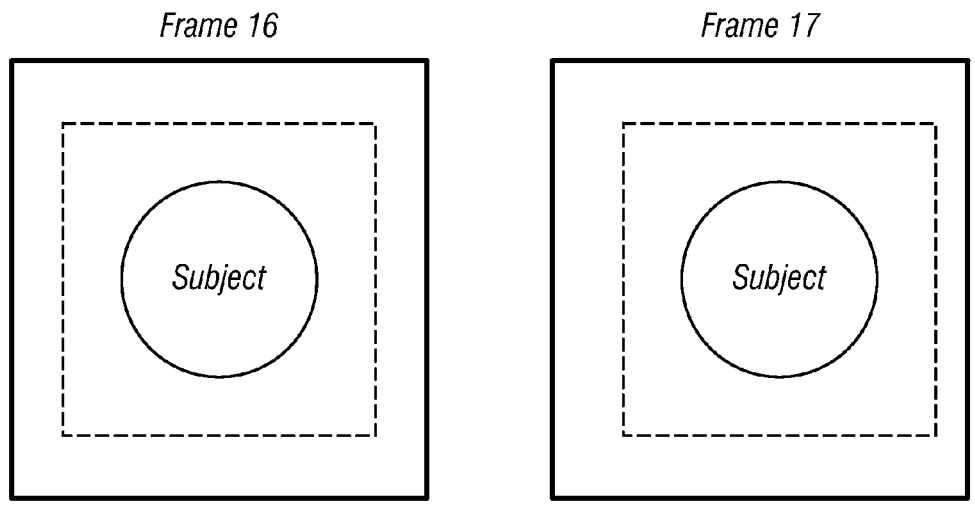
FIGS. 8-9 show detecting shift in camera motions.

The temporal compression is shown in FIG. 2. First, camera motion within a group of images is measured at 200. FIG. 8 shows how frames 15 & 16 may include the subject at slightly different positions in the image. More generally, the camera motion compensation can start by investigating the middle of the group of frames at frame 16, as shown in FIG. 8. Frames are investigated by viewing the middle of the group of frames and going towards the edge. Consider a group of frames such as 32 image frames. In FIG. 8, frame 17 is read and correlated with frame 16, using a number of different techniques, including different shifts over a number of different images. For example, each of 1000 different shifts may be used to correlate the image part (shown as "subject" in the frame) found in frame 17 to the image part found in frame 16.

At 215, the shift which leads to the lowest root mean square error is found. The shift that produces that smallest error is selected as the motion vector for the frame, shown by the motion vector arrow in FIG. 8.

Figure 9:
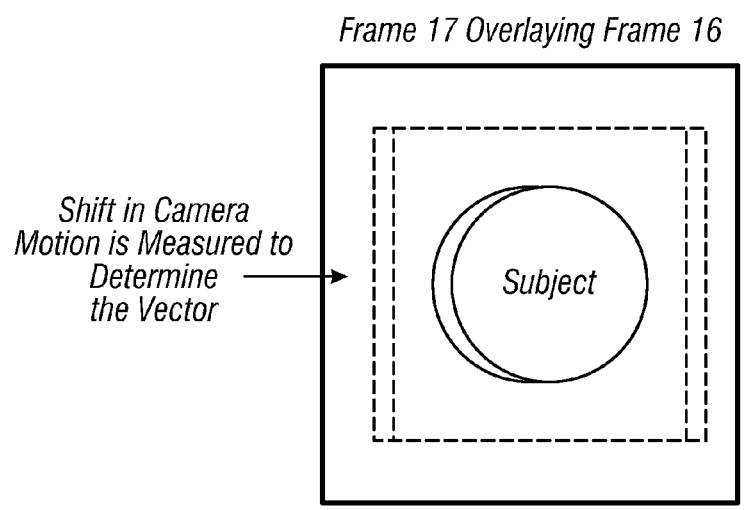
Figure 10:
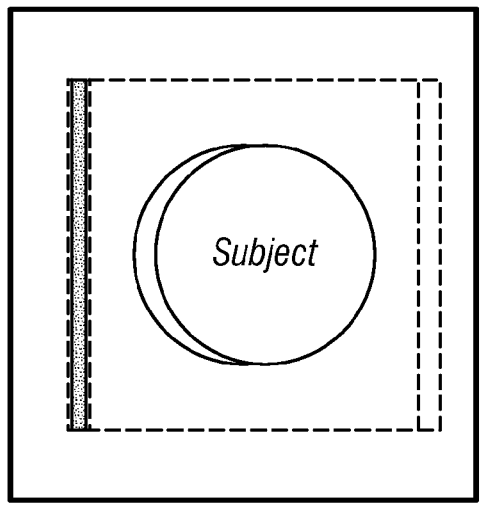
FIG. 10 shows a border frame created by the shift in camera motion.
Figure 11:
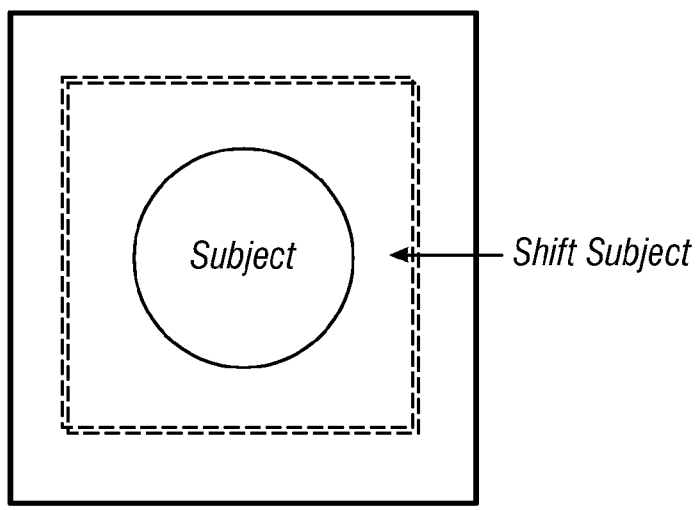
FIG. 11 shows a shifted frame shifted back to the position of the reference frame.

FIG. 9 illustrates how the shifting camera motion can be measured to determine the vector by overlaying one frame over the next frame. FIG. 10 shows how the darkened area of the subject can be removed and becomes the border frame, while FIG. 11 shows how the subject of the shifted frame can be shifted back to the position of the reference frame. The border frame is extracted from the image, as the difference between one image and the other. The measured portion of the border frame is shifted from the position of the reference frame. This is carried out for each of the frames until the end of the group of frames is reached. The process can also be repeated backwards, with frame 17 reviewing back to frame 16.

This can be done within any group of frames, for example all frames within the group of frames can be aligned according to the camera motion.

Shifted positions of all the frames are assembled into a new stack of frames which are then compressed using a three-dimensional combination of spatial and temporal wavelet transforms at 110 and 120. The border location of each frame is not motion compensated.

Figure 3:
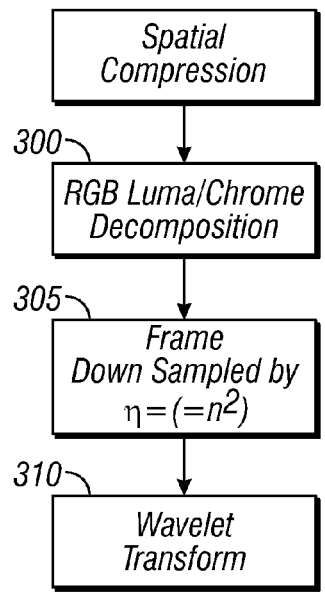
FIG. 3 shows a detailed flowchart of spatial compression.

This portion is compressed using wavelet spatial transmission at 120, according to the flowchart of FIG. 3.

At 300, color images representing frames are converted from their red green blue representation to a luma/chroma representation. The luma channel represents the grayscale information commonly known as luminance, and two chroma channels represent the color channels of the image. This allows the wavelet transform to operate more effectively.

At 305, each frame is downsampled by a factor $\eta^2$, where $\eta$ can be for example 2, causing an effective downsampling by 4. This can be done, for example, by extracting every second row and every second column of the frame. This provides a downsampled frame ¼ as large as the original frame. Further compression is carried out on the downsampled frame at 310.

When decoding, the downsampled frame is reconstructed and inserted into a frame of the original size. Information for missing rows and columns are linearly interpolated at 155.

At 310, the downsampled frame is compressed using the wavelet transform. The wavelet transform can localize frequency content. Unlike the Fourier transform, the wavelet transform can extract information from specific parts of the image. However, the wavelet transform in this embodiment may be implied to the entire frame. This may use a Daubechies filter of length 2, 4, or 6. For filter lengths 4 and 6, exact boundary filters can be used to properly transform the image near the boundaries. The use of relatively short filters and boundary filters may be particularly crucial for smaller images, where boundary artifacts otherwise can take up a significant part of the image area.

Finally, the compressed frames and their corresponding motion vectors in border frames are encoded based using the tree entropy encoder as described above.

The decoding process carried out in the decoder reinserts the border frame back into the component at 160 using the motion vector for placement.

The entropy coding at 130 encodes the wavelet transform into a bitstream using a tree-based entropy coder. Roots of the entropy tree are used the wavelet detail coefficients on the coarsest scale. This string can then be encoded using runlength/Huffman coding. The runlength coding is only used for portions of the image where is beneficial, for example large areas of the image that are more or less all the same.

Keyframes are formed using a HAAR space wavelet.

Figure 12A:
FIGS. 12A-12B show the difference between a background field and a correction field.

As described above, general motion compensation compensates for motion that does not originate by camera motion. Non camera motion compensation can compensate for a motion which moves all features of the video uniformly. This compensation is achieved by splitting the movie into two parts at 135. The first part is compressed without motion compensation using the techniques of spatial and temporal compensation discussed above. This compression ratio is set to a level to use some part of the available bit budget—here 75%. This compressed video is referred to as the background field, which is shown in FIG. 12A.

Then, the difference between the original movie in the background field is compressed separately at 140 using the remainder of the bit budget. This is referred to as the correction field. A color-neutral correction field is shown in FIG. 12B.

Figure 12B:
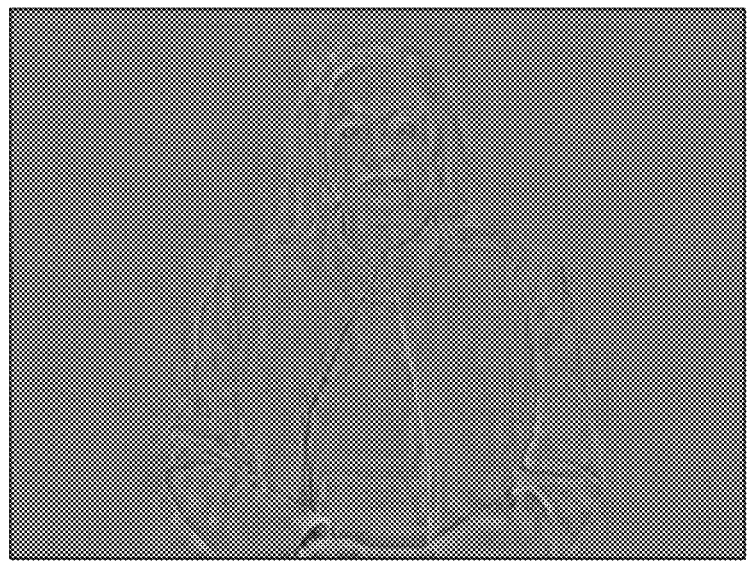

Next, the correction field is compressed separately,

This correction field is concentrated near edges and areas with motion, as can be seen from FIG. 12B. Attention is concentrated on those areas. Areas where the correction field contains large areas with no information are compressed locally.

The correction field therefore is decomposed into a large number of small areas. These typically rectangular areas are rotated to align along the features that need to be compressed. In this way, the rectangle follows the rotation such that features are aligned between rectangles in consecutive frames. The encoder at 141 rotates the rectangle among different angles to find the best compression fit, and then computes an error between the rotated area and the corresponding area in the previous frame, and then select the rotation that produced the best match.

The center of each region is adjusted between frames in order to track the feature inside the region resulting in a stack of regions. Each stack is compressed using the wavelet transform and entropy coding.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other techniques can be used.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method of encoding a video, comprising:
    first, carrying out first motion compensation within a video that has resulted from camera motion, by first finding a group of frames, and finding camera motion among the group of frames, and carrying out first motion compensation within said group of frames that has resulted from camera motion to shift frames in said group of frames in a way that creates a smallest mean square error, and to reduce said error to align the group of frames into a stack, wherein said motion compensation finds borders of said frames as part of said first motion compensation, and wherein said borders are not motion compensated;
    second, carrying out second motion compensation in the stack that is not resulting from camera motion; encoding said first and second motion compensations separately; and
    dividing the video into first and second parts, which respectively occupy first and second parts of a total bit budget for compression, separately compressing the first part to create a first compressed part as said first carrying out, and to create a second part to create a second compressed part as said second carrying out, wherein said first compressing and said second compressing use different compression techniques.

2. A method as in claim 1, wherein said encoding comprises separately using spatial compression and temporal compression.

3. A method as in claim 1, wherein said first part uses said camera motion compensation and said second part uses a general motion compensation.

4. A method as in claim 3, wherein said first part uses 75% of an available bit budget and said second part uses 25% of the available bit budget.

5. A method as in claim 1, wherein said first encoding uses a downsampling technique which downsamples a video by an amount η, where η2 is a numerical percentage of downsampling.

6. A method as in claim 5, wherein said first encoding downsamples the video by four, by removing every second line.

7. A method as in claim 1, further comprising decomposing the video into a group of frames.

8. A method as in claim 7, wherein said decomposing comprises comparing each frame in the group of frames with another frame in the group of frames.

9. A method as in claim 8, wherein said comparing comprises comparing each frame to a frame in the forward direction and also comparing each frame to a frame in the backward direction.

10. A method as in claim 1, wherein said encoding includes all of temporal compression, spatial compression and entropy compression.

11. A method as in claim 1, wherein said encoding comprises decomposes an image into different resolutions arranged hierarchically from coarsest detail of resolution to finest detail of resolution.

12. A encoding system, comprising:
    a computer, carrying out compression of a video, by first finding a group of frames, and finding camera motion among the group of frames, and carrying out first motion compensation within said group of frames that has resulted from camera motion to shift frames in said group of frames in a way that creates a smallest mean square error, and to reduce said error to align the group of frames and also assembling the frames which have been aligned into a stack, and separately carrying out second motion compensation in the video that is not resulting from camera motion and separately encoding and compressing data resulting from said first motion compensation and said second motion compensation;
    wherein said computer finds borders of said frames as part of said first motion compensation, and wherein said borders are not motion compensated; and
    divides the video into first and second parts, which respectively occupy first and second parts of a total bit budget for compression, and separately compresses the first part to create a first compressed part, and to create a second part to create a second compressed part, wherein said first compressing and said second compressing use different compression techniques.

13. A system as in claim 12, wherein said encoding system separately uses both spatial compression and temporal compression.

14. A system as in claim 12, wherein said encoding system uses a downsampling technique which downsamples a video by an amount $\eta$, where $\eta^2$ is a numerical percentage of downsampling.

15. A system as in claim 14, wherein said first encoding downsamples the video by four, by removing every second line.

16. A system as in claim 12, wherein said encoding system decomposes the video into a group of frames.

17. A system as in claim 16, wherein said decomposes comprises comparing each frame in the group of frames with another frame in the group of frames.

18. A system as in claim 17, wherein said comparing comprises comparing each frame to a frame in the forward direction and also comparing each frame to a frame in the backward direction.

19. A system as in claim 12, wherein said encoding system uses all of temporal compression, spatial compression and entropy compression.

20. A system as in claim 12, wherein said encoding system uses a wavelet transform that decomposes an image into different resolutions arranged hierarchically from coarsest detail of resolution to finest detail of resolution.

21. A method of encoding a video, comprising: encoding a video to create a graded resolution portion, having a first image portion representing a coarse level of details, and a second resolution portion representing a second finer level of details; spatially encoding a portion of the video and also temporally encoding said video, wherein said temporally encoding creates a first encoded portion that first motion compensation within a video that has resulted from camera motion among a group of frames, a border location of said group of frames of a video, and has second motion compensation in the video that has not resulted from camera motion, and wherein said second motion compensation does not encode said border location, and also entropy encoding said video; and dividing the video into first and second parts, which respectively occupy first and second parts of a total bit budget for compression, separately compressing the first part to create a first compressed part as said first carrying out, and to create a second part to create a second compressed part as said second carrying out, wherein said first compressing and said second compressing use different compression techniques.

22. A method as in claim 21, further comprising downsampling said video by an amount $\eta$, where $\eta^2$ is a numerical percentage of downsampling.

23. A method as in claim 22, wherein said first encoding downsamples the video by four, by removing every second line.

\* \* \* \* \*